US011421765B2

(12) United States Patent
Groll

(10) Patent No.: US 11,421,765 B2
(45) Date of Patent: Aug. 23, 2022

(54) ACTUATING MECHANISM WITH A PLANETARY ROLLER SCREW MECHANISM

(71) Applicant: SKF MOTION TECHNOLOGIES AB, Gothenburg (SE)

(72) Inventor: Arnaud Groll, Chambery (FR)

(73) Assignee: SKF Motion Technologies AB, Gothenburg (SE)

( * ) Notice: Subject to any disclaimer, the term of this patent is extended or adjusted under 35 U.S.C. 154(b) by 124 days.

(21) Appl. No.: 16/704,023

(22) Filed: Dec. 5, 2019

(65) Prior Publication Data

US 2020/0182338 A1    Jun. 11, 2020

(30) Foreign Application Priority Data

Dec. 5, 2018    (EP) ..................... 18210539

(51) Int. Cl.
*F16H 25/22*    (2006.01)

(52) U.S. Cl.
CPC . *F16H 25/2252* (2013.01); *F16H 2025/2257* (2013.01)

(58) Field of Classification Search
CPC ......... F16H 25/2252; F16H 2025/2257; F16H 25/2266; F16H 25/205; F16H 25/2018
USPC .................................................... 74/424.92
See application file for complete search history.

(56) References Cited

U.S. PATENT DOCUMENTS

| 3,214,991 | A | * | 11/1965 | Perrin | ................. F16H 25/2252 74/424.92 |
| 3,583,254 | A | * | 6/1971 | Winders | ............. F16H 25/2025 74/89.39 |
| 10,584,777 | B2 | * | 3/2020 | Dubus | .................. F16K 31/508 |
| 2016/0348775 | A1 | * | 12/2016 | Schumann | .......... F16H 25/2252 |
| 2017/0219070 | A1 | * | 8/2017 | Pasquet | .................. F16D 65/18 |
| 2017/0334003 | A1 | * | 11/2017 | Lawlor | .................. F16H 3/727 |
| 2017/0335991 | A1 | * | 11/2017 | Dubus | .................. F16K 31/508 |

FOREIGN PATENT DOCUMENTS

| JP | 2007100761 A | 4/2007 |
| WO | 2017025118 A1 | 2/2017 |
| WO | WO-2017122990 A1 * | 7/2017 ............ B65G 49/06 |

* cited by examiner

*Primary Examiner* — Jake Cook
*Assistant Examiner* — Gregory Robert Weber
(74) *Attorney, Agent, or Firm* — Laurence A. Greenberg; Werner H. Stemer; Ralph E. Locher

(57) ABSTRACT

An actuating mechanism has a main rotational drive and a roller screw mechanism coupled to the main rotational drive. The roller screw mechanism has a screw, a nut, and a plurality of rollers. One of the screw and the nut is coupled to the main rotational drive, while the other is movable relative to the rollers both translationally and rotationally. The roller screw mechanism also has an annular guide for circumferential and axial retention of the rollers. The annular guide contains a cylindrical sleeve that extends axially outward from one of the annular heels beyond the nut. The screw extends into a bore of the sleeve, and the sleeve is coupled to a secondary rotational drive.

9 Claims, 8 Drawing Sheets

ACTUATING MECHANISM WITH A PLANETARY ROLLER SCREW MECHANISM

CROSS-REFERENCE TO RELATED APPLICATION

This application claims the priority, under 35 U.S.C. § 119, of European application EP 18210539, filed Dec. 5, 2018; the prior application is herewith incorporated by reference in its entirety.

BACKGROUND OF THE INVENTION

Field of the Invention

The present invention relates to the field of actuating mechanisms containing a rotational drive and a roller screw mechanism that makes it possible to transform a rotational movement into a linear translational movement and vice versa, and more particularly to planetary roller screw mechanisms.

Such a roller screw mechanism is furnished with a screw that contains an outer threading, a nut disposed around the screw and containing an inner threading, and a plurality of longitudinal rollers that engage with the outer and inner threadings of the screw and nut, respectively. A roller screw mechanism has the principal advantage of having higher permissible load capacities, relative to a ball screw mechanism.

A first type of roller screw mechanism contains rollers with an outer threading that engages with the outer and inner threadings of the screw and nut, respectively. The roller threadings and the nut threading have helix angles that are identical to each other and different from the screw threading, so that when the screw rotates relative to the nut, the rollers rotate in place while rotating around the screw but do not move axially inside the nut. The rollers are guided in rotation parallel to the axis of the screw by teeth that are attached to the nut and engage with teeth furnished on the rollers. Such a mechanism is called a planetary roller screw.

A second type of roller screw mechanism with a similar operating principle but with a reverse arrangement is also known. The helix angles of the threadings of the rollers, screw, and nut are selected such that, when the screw rotates relative to the nut, the rollers will rotate in place around the screw and move axially in the nut.

The rollers are guided in rotation parallel to the axis of the screw by teeth that are arranged thereon and cooperate with teeth of the rollers. Such a mechanism is called an inverted planetary roller screw.

In some applications, it is desirable to have an element the output movement of which combines both linear translation and rotation. The current solution to such a problem is to provide an assembly that includes two associated screw mechanisms, one of which is dedicated to linear translation movement, while the other enables rotational movement. However, this has the drawback of high cost and large axial and/or radial dimensions.

Another structural limitation of planetary roller screw mechanisms is that they do not permit thread pitches that are sufficiently small to achieve high precision of linear displacement, particularly at low speed and under heavy load, and also do not allow thread pitches that are sufficiently large to achieve a high linear displacement speed, particularly at low load.

SUMMARY OF THE INVENTION

It is accordingly an object of the invention to provide an actuating mechanism with a planetary roller screw mechanism that overcomes the above-mentioned disadvantages of the prior art devices of this general type, and aims to remedy the drawbacks of the prior art.

More particularly, the present invention aims to provide an actuating mechanism with a roller screw mechanism wherein, for a given speed and load, the linear displacement precision is optimized and, for a given load, the linear displacement speed is optimized, while also being compact and low cost, allowing an output movement that combines linear displacement and rotation.

The invention relates to an actuating mechanism containing a main rotational drive and a roller screw mechanism coupled to the drive.

The roller screw mechanism is furnished with a screw containing an outer threading, a nut disposed around and co-axial to the screw, the nut containing an inner threading, and a plurality of rollers interposed between the screw and the nut and each containing an outer threading that engages with the outer and inner threadings of the screw and the nut, respectively.

One of the screw and nut is coupled to the main rotational drive, and the other movable relative to the rollers both translationally and rotationally.

The roller screw mechanism also contains an annular guide for circumferential and axial retention of the rollers. The guide is mounted radially between the screw and the nut. The guide contains a first annular heel, a second annular heel, and a plurality of elongated portions that axially connect the first and second heels so as to define a plurality of recesses that separated from each other in the circumferential direction by the elongated portions; each of the recesses accommodates a roller.

According to the invention, the annular guide contains a cylindrical sleeve that extends axially outward from one of the annular heels to beyond the nut, the screw extending into a bore in the sleeve. The sleeve is coupled to a secondary rotational drive.

According to other advantageous but non-mandatory characteristics of the invention, taken separately or in combination:
a) The nut is coupled to the main rotational drive, and the roller screw mechanism is a planetary roller screw mechanism.
b) The screw is coupled to the main rotational drive, and the roller screw mechanism is an inverted planetary roller screw mechanism.
c) Each roller contains two cylindrical journals that extend axially outward from one axial end of the roller.
d) The first and second annular heels of the guide comprise a plurality of recessed areas formed at each axial end of the roller-receiving recesses, each recessed area receiving one journal of the rollers.
e) Each roller contains two sets of teeth on either side of the outer threading and at each axial end.
f) The mechanism contains two annular crown rings fixed in an unthreaded part of the bore of the nut, each internally containing teeth that engage with the corresponding teeth of the rollers.
g) The main drive comprises a first motor.
h) A secondary drive contains a second motor separate from the first motor.

i) The secondary drive contains the first motor and a gear train that rotatably couples the guide with one of the screw and the nut that is coupled to the main drive means.

j) The guide contains two symmetrical guide portions, each of which comprises a sleeve coupled to the secondary drive means.

k) The secondary drive contains two gears coupled by a shaft and driven rotationally by a motor, each of the gears being coupled with a sleeve of one of the guide portions.

Other features which are considered as characteristic for the invention are set forth in the appended claims.

Although the invention is illustrated and described herein as embodied in an actuating mechanism with a planetary roller screw mechanism, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
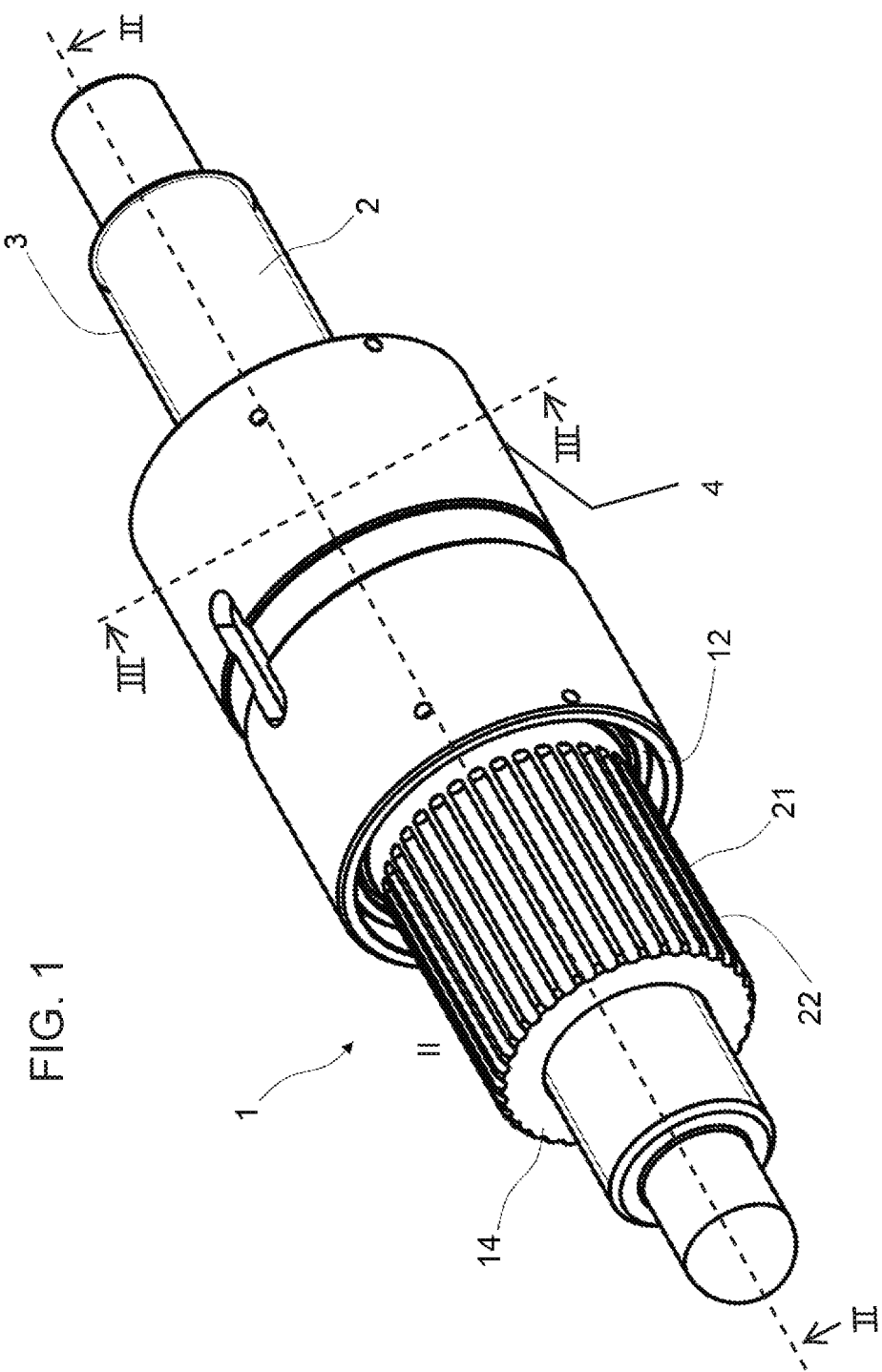
FIG. 1 is a diagrammatic, perspective view of a roller screw mechanism according to one embodiment of the invention.
Figure 2:
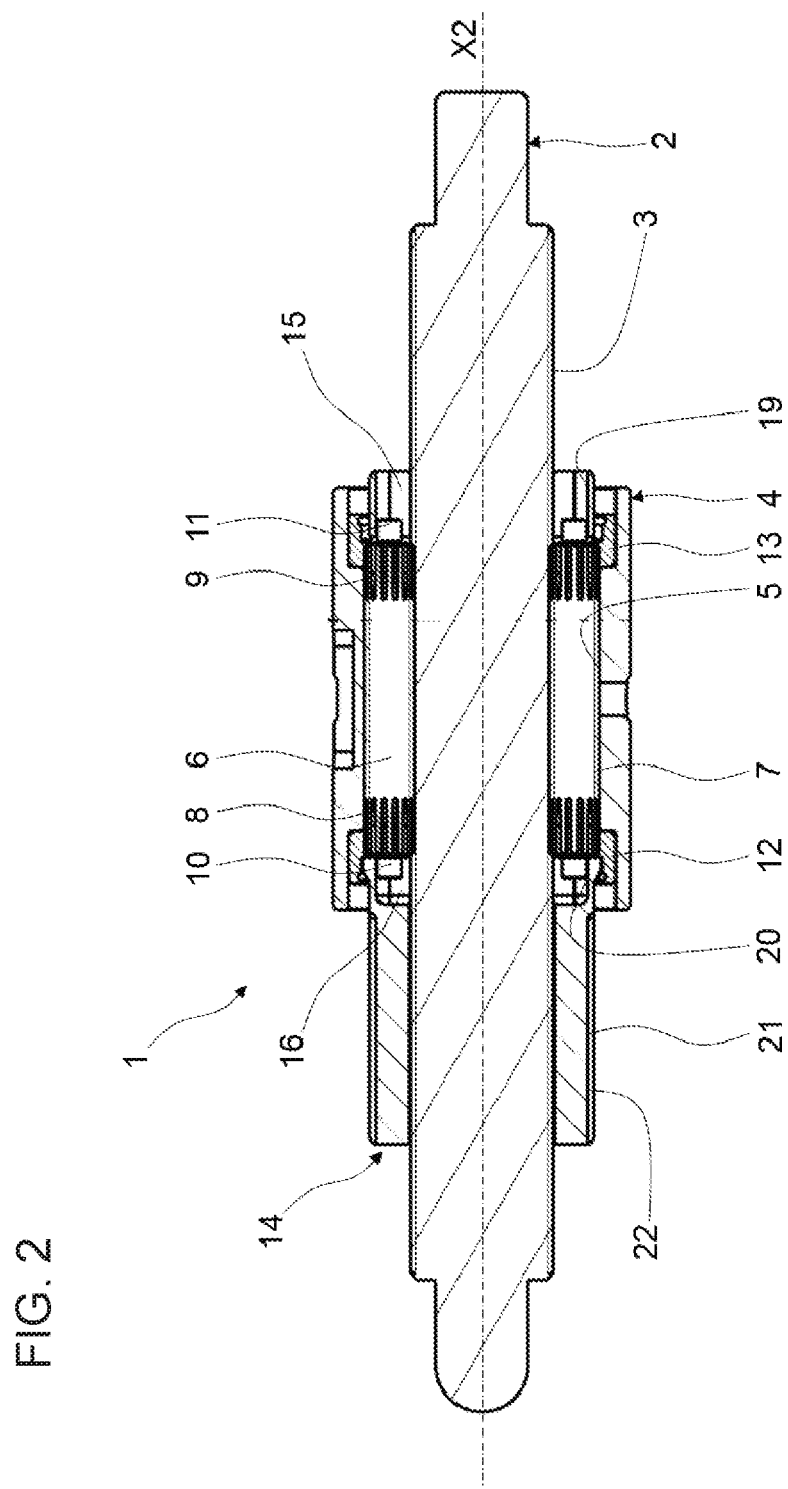
FIG. 2 is an axial cross-sectional view of the roller screw mechanism taken along the line II-II shown in FIG. 1.
Figure 3:
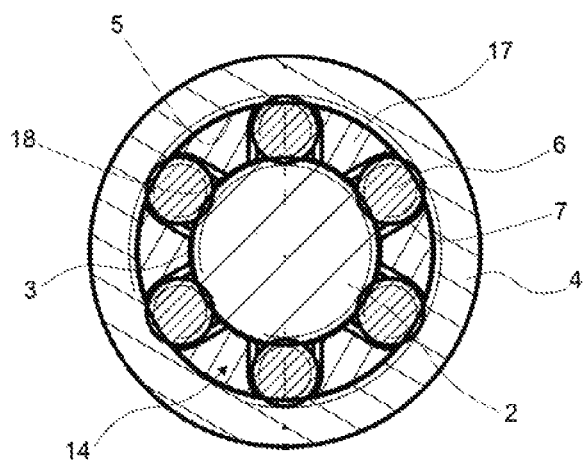
FIG. 3 is a radial cross-sectional view taken along the line III-III of the roller screw mechanism shown in FIG. 1.

Referring now to the figures of the drawings in detail and first, particularly to FIGS. 1-3 thereof, there is shown a roller screw mechanism, identified as a whole by reference numeral 1. The roller screw mechanism 1 has a screw 2, of axis X2, furnished with an outer threading 3, a nut 4 mounted co-axially around the screw 2 and furnished with an inner threading 5 the inner diameter of which is greater than the outer diameter of the outer threading 3, and a plurality of longitudinal rollers 6 that are arranged radially between the screw 2 and the nut 4. The screw 2 extends longitudinally through a cylindrical bore of the nut 4 on which the inner threading 5 is formed.

The rollers 6 are identical to each other and are evenly distributed around the screw 2. Each roller 6 extends along a longitudinal axis coaxial with the screw axis X2, and contains an outer threading 7 that engages with the outer threading 3 of the screw 2 and the inner threading 5 of the nut 4. The threading 7 of each roller 6 is extended axially at each end by an external set of teeth 8, 9 that is itself extended by a cylindrical journal 10, 11 that extends outward.

The nut 4 further contains two annular crown rings 12, 13 fixed in a non-threaded part of its bore, each of which internally contains a set of teeth that engages with corresponding teeth 8, 9 of the rollers 6 in order to synchronize them. The crown rings 12, 13 and rollers 6 are fully housed in the nut 4; more precisely, they do not extend beyond the nut.

The roller screw mechanism 1 also contains an annular guide 14 for circumferential and axial retention of rollers 6 between the screw 2 and nut 4. The guide 14 is mounted radially and co-axially between the screw 2 and the nut 4.

Figure 4:
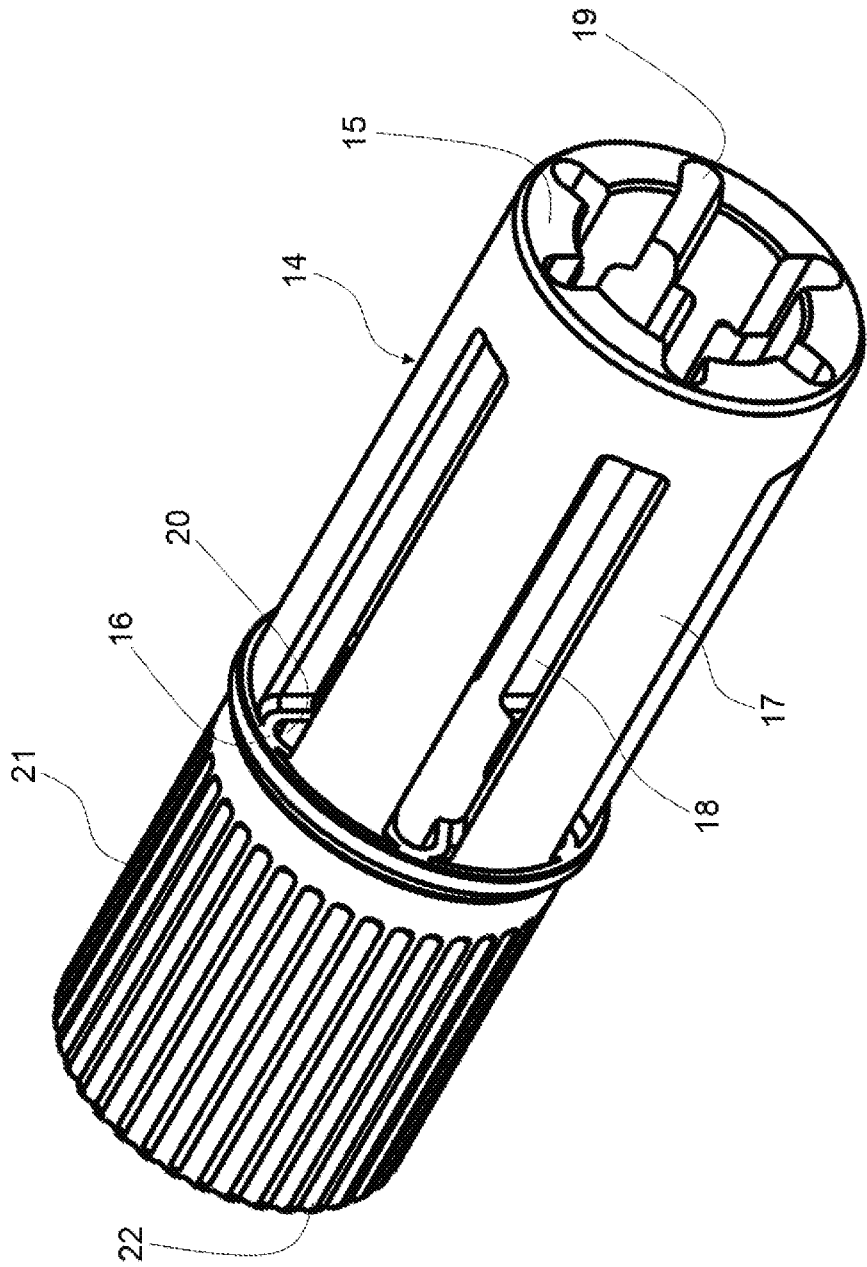
FIG. 4 is a perspective view of a guide of the roller screw mechanism shown in FIG. 1.

As shown in FIG. 4, the guide 14 contains a first annular heel 15 and a second annular heel 16, and the heels are axially opposed. The guide 14 also contains a plurality of elongated portions 17 that axially connect the first and second heels 15, 16 so as to define a plurality of recesses 18 that are separated from each other in the circumferential direction by the elongated portions 17.

The recesses 18 are advantageously distributed evenly in the circumferential direction. In the embodiment illustrated in FIG. 4, the guide 14 is made up of a single piece.

Each of the recesses 18 accommodates a roller 6. The first and second heels 15, 16 form axial stops for the rollers 6. The outer diameter of the elongated portions 17 is strictly smaller than the inner diameter of the inner threading 5 of the nut 4, so as to allow the threading 5 to engage with the outer threadings 7 of the rollers 6. The outer diameter of the elongated portions 17 is strictly smaller than the inner diameter of the inner sets of teeth of the crown rings 12, 13 so that the teeth of the crown rings 12, 13 may couple with the outer teeth 8, 9 of the rollers 6. The inner diameter of the elongated portions 17 is strictly greater than the outer diameter of the outer threading 3 of the screw 2, so as to allow the threading 3 to engage with the outer threading 7 of the rollers 6.

The first and second annular heels 15, 16 of the guide 14 respectively contain a plurality of recessed areas 19, 20, formed at each axial end of the recesses 18 that accommodate the rollers 6. Each of the recessed areas 19, 20 accommodates a corresponding journal 10, 11 of the rollers 6.

According to the invention, the annular guide 14 contains a cylindrical sleeve 21 that extends axially outward from the second annular heel 16 beyond the nut 4. The screw 2 extends into a bore of the sleeve 21. Advantageously, the outer surface of the cylindrical sleeve 21 is furnished with an outer set of teeth 22.

Figure 5:
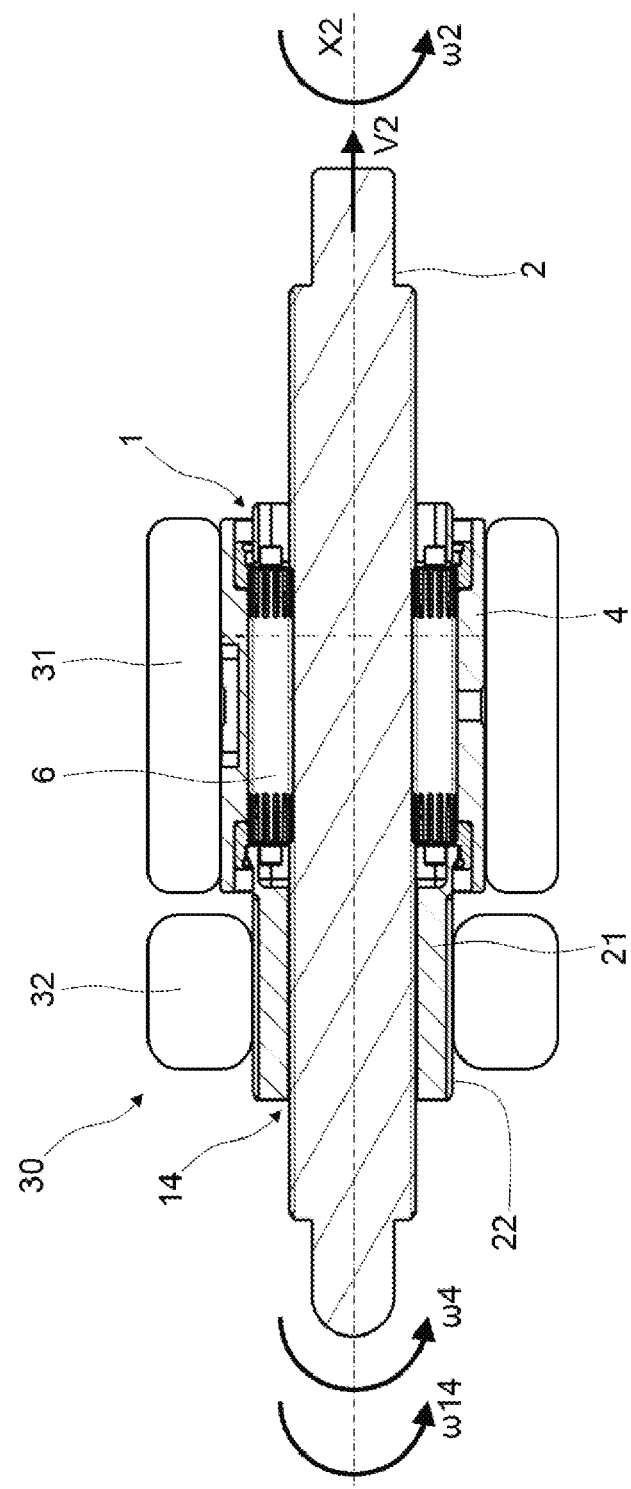
FIG. 5 is a functional diagram of an axial cross-sectional view of an actuating mechanism according to a first embodiment of the invention.

Such a roller screw mechanism 1 according to the invention may advantageously be used in an actuating mechanism, as shown in FIG. 5 according to a first embodiment of the invention.

An actuating mechanism, indicated as a whole by reference numeral 30, contains the roller screw mechanism 1, main rotational drive 31, and secondary rotational drive 32.

The nut 4 is rotatably coupled to the main rotational drive 31. The main rotational drive 31 advantageously contains a rotating motor coupled by any suitable means to the nut 4 in order to transmit to the nut a rotational movement ω4 about the axis X2.

The screw 2 is accordingly movable by linear displacement relative to the nut 4. Thus, the roller screw mechanism 1 is a planetary roller screw mechanism.

The sleeve 21 of the guide 14 is rotatably coupled to the secondary rotational drive 32. The secondary rotational drive 32 advantageously contains a rotating motor coupled by any suitable means to the sleeve 21, so as to transmit a rotational movement ω14 about the axis X2. For example, the secondary rotational drive 32 contains a gear (not shown) that is rotatably coupled to the motor and engages with the outer set of teeth 22 of the sleeve 21.

When the nut 4 and guide 14 are rotated by the main 31 and secondary 32 rotational drives, respectively, the rollers 6 rotate in place and rotate around the screw 2 but do not move axially inside the nut 4. The rollers 6 are guided in rotation parallel to the axis X2 by the teeth of the crown rings 12, 13. The nut 4 and guide 14 are axially fixed and only the screw 2 has a linear displacement movement V2 along the axis X2. In addition, when the guide 14 and the nut 4 are driven at different rotational speeds, a rotational movement ω2 of the screw 2 is induced.

As a result of the invention, the output movement of the actuating mechanism 30 consists of a linear displacement movement V2 combined with a rotational movement ω2 of screw 2 such that:

$$\omega 2 = \omega 14 \times (1 + \text{nut diameter/screw diameter}) - \omega 4 \times (\text{nut diameter/screw diameter});$$

$$V2 = \text{screw pitch} \times (\omega 4 - \omega 14);$$

where the screw diameters 2 and nut diameters 4 are the pitch diameters.

In addition, it is possible to achieve higher speeds of linear displacement V2 than is the case with a roller screw mechanism driven by a simple rotational drive. It is also possible to ensure very high precision of linear and rotational displacement by controlling the combined rotational speeds ω4 and ω14. Particularly advantageously, the drive means may also be equipped with linear and/or angular position sensors.

Another advantage of the present invention is that it allows the speed V2 of screw 2 to be modulated during linear displacement. For example, the linear displacement movement of the screw 2 may change from a very high speed V2 to a speed that is lower but has more precision. This reduces the actuation time to position the screw at high speed, not requiring precise control, and then adjust the final position at a reduced speed.

Figure 6:
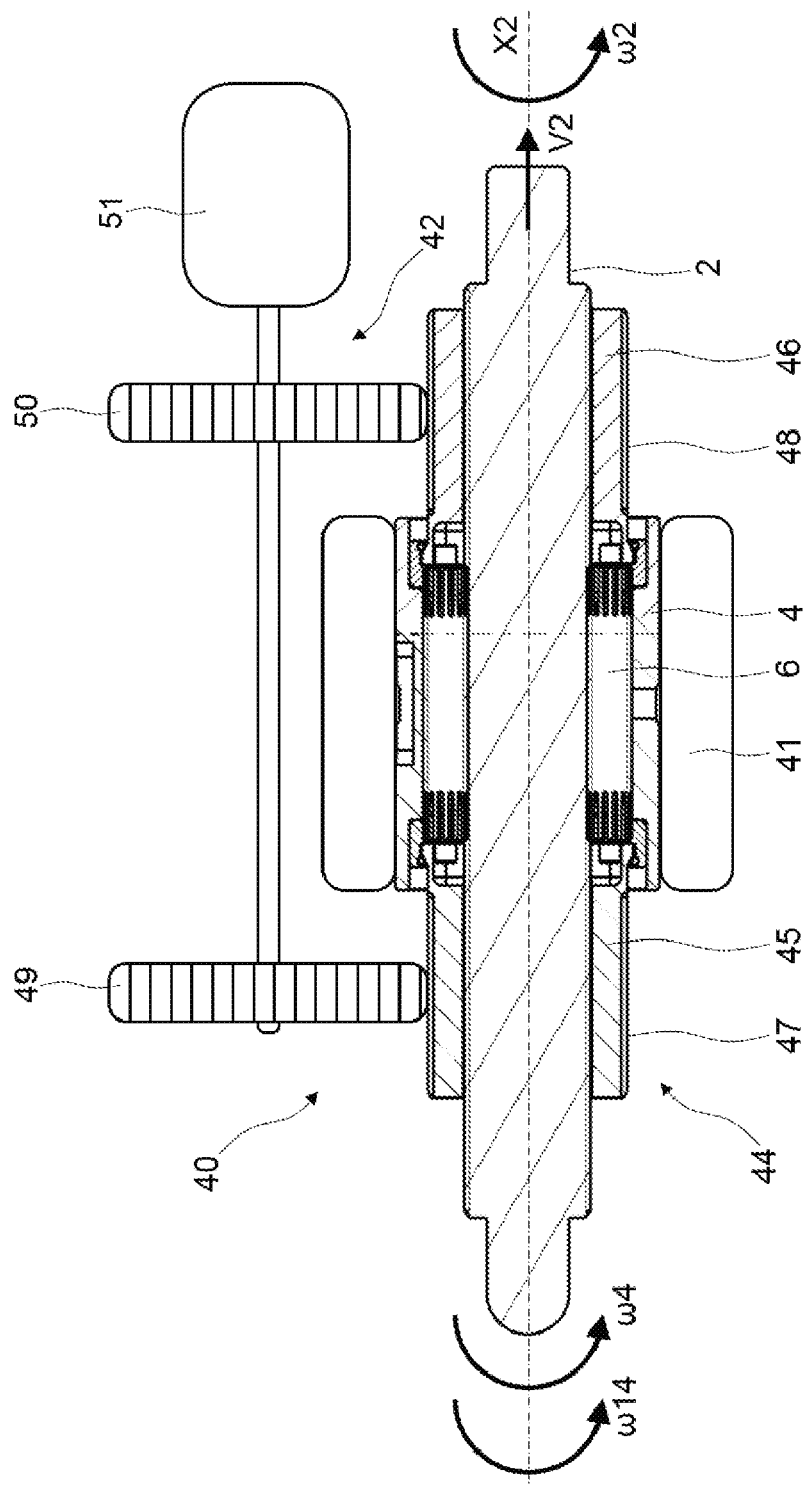
FIG. 6 is functional diagram of an axial cross-sectional view of an actuating mechanism according to a second embodiment of the invention.

FIG. 6 illustrates a second embodiment of an actuation mechanism 40 according to the invention.

The actuating mechanism contains a roller screw mechanism 43, a main rotational drive 41, and a secondary rotational drive 42.

The roller screw mechanism 43 is substantially similar to the above-described roller screw mechanism 1, and differs only by a guide 44 for the rollers 6, which contains two guide portions 45, 46.

The guide portions 45, 46 are symmetrical, axially joined, and each respectively comprise a sleeve 47, 48 coupled to the secondary drive 42.

Preferably, the secondary rotational drive 42 contains two gears 49, 50 coupled rotatably to a motor 51; between them, each of the gears 49, 50 engages with the outer teeth of a sleeve 47, 49 of a corresponding guide portion 45, 46. The two guide portions 45, 46 are thus coupled rotatably and rotate at the same speed ω44 around the axis X2.

The main rotational drive means 41 is substantially similar to the means 31 described above, and the actuating mechanism 40 has an operating mode substantially similar to the above-described mechanism 30.

Figure 7:
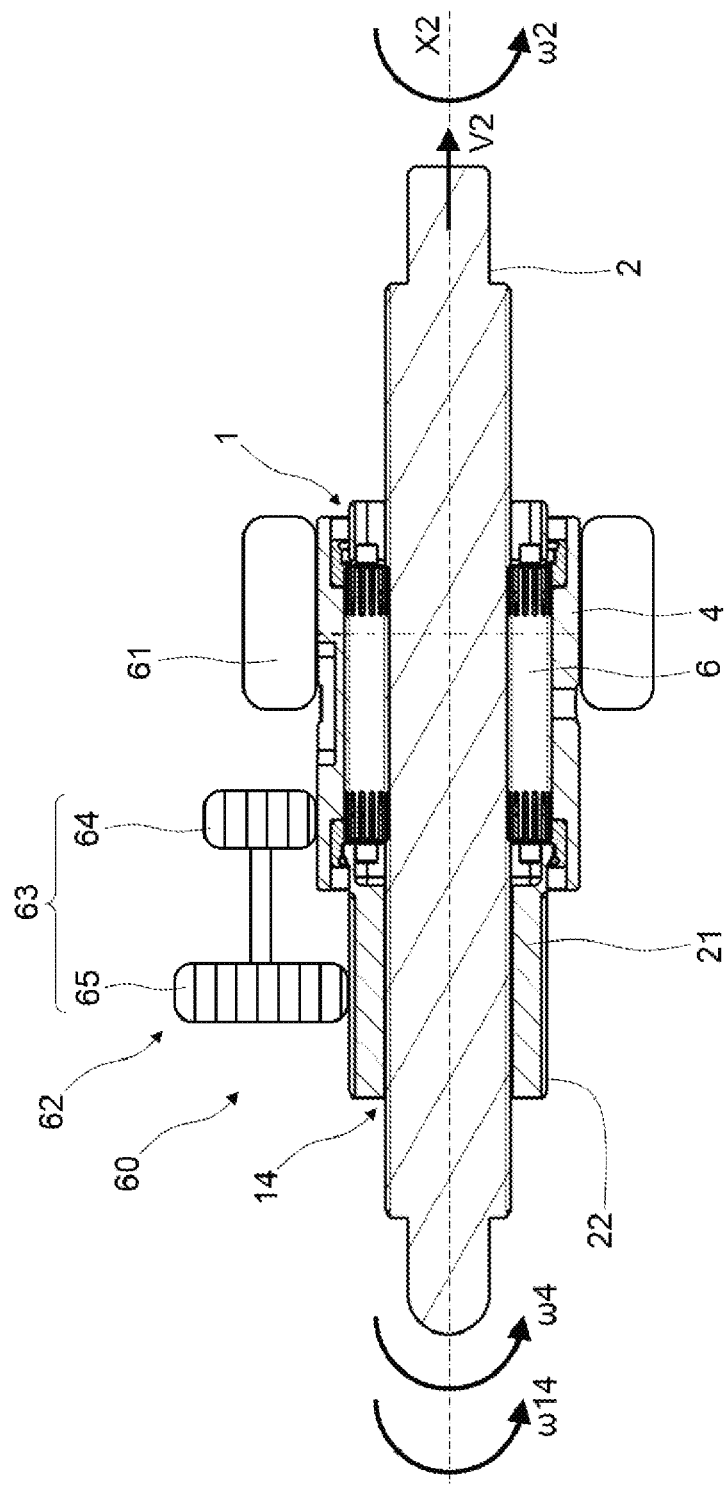
FIG. 7 is a functional diagram of an axial cross-sectional view of an actuating mechanism according to a third embodiment of the invention.
Figure 8:
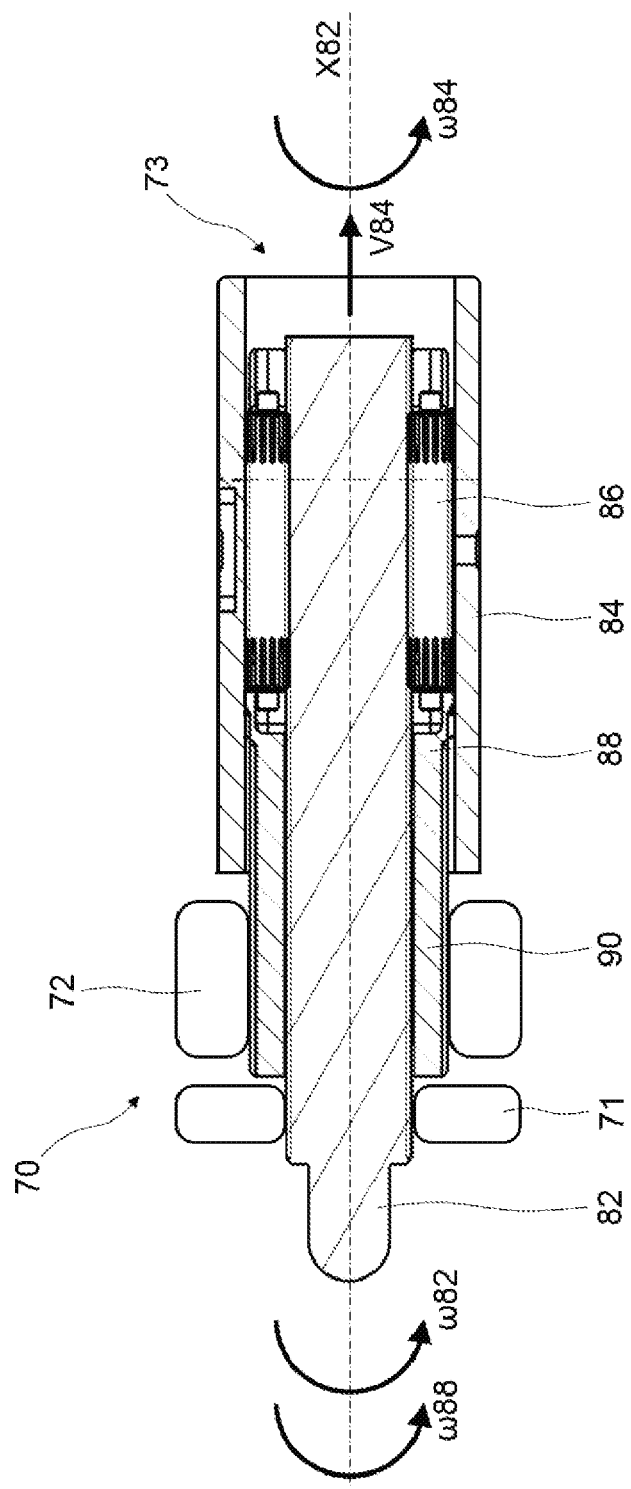
FIG. 8 is a functional diagram of an axial cross-sectional view of an actuating mechanism according to a fourth embodiment of the invention.

FIG. 7 illustrates a third embodiment of an actuation mechanism 60 according to the invention.

The actuating mechanism 60 contains the roller screw mechanism 1, the main rotational drive 61, and the secondary rotational drive 62.

The nut 4 is rotatably coupled to the main rotational drive 61. The main rotational drive 61 advantageously contains a rotating motor coupled by any suitable means to the nut 4 in order to impart a rotational movement ω4 thereto. The screw 2 is accordingly movable by linear displacement relative to the nut 4.

In this embodiment presented by way of example, the secondary rotational drive 62 contains a gear train 63 that rotatably couples the guide 14 with the nut 4, which in turn is coupled to the main rotational drive 61. Preferably, the outer surface of the nut 4 contains an outer set of teeth that cooperates with a first gear 64, and the outer surface of sleeve 21 of the guide 14 contains an outer set of teeth that cooperates with a second gear 65. The two gears 64, 65 are coupled rotatably about an axis. The guide 14 is thus set in rotational movement ω14 about the axis X2. By way of example, the gear train 63 may be of the epicyclic type.

In this case, a difference in speed between the nut 4 and the guide 14 may be created by dimensioning the gears 64, 65 of the gear train 63 in a specific way. The actuating mechanism 60 thus has an operating mode that is substantially similar to the above-described mechanism 30.

An actuating mechanism, identified as a whole by the reference numeral 70, comprises a roller screw mechanism 73, a main rotational drive 71, and a secondary rotational drive 72.

The roller screw mechanism 73 is substantially similar in structure to the roller screw mechanism 1, with a screw 82, a nut 84, a plurality of rollers 86 and a guide 88.

The screw 82 is rotatably coupled to the main rotational drive 71. The main rotational drive 71 advantageously contains a rotating motor coupled by any suitable means to the screw 82 in order to impart thereto a rotational movement ω82 about an axis X82. Accordingly, the nut 84 may be linearly displaced relative to the screw 82.

Thus, the roller screw mechanism 73 is an inverted planetary roller screw mechanism.

The guide 88 contains a sleeve 90 that extends axially beyond the linear stroke of the nut 84. The sleeve 90 is rotatably coupled to the secondary rotational drive 72. The secondary rotational drive 72 advantageously contains a rotating motor coupled by any suitable means to the sleeve 90 in order to impart thereto a rotational movement ω88 about the axis X82.

When the screw 82 and guide 88 are rotated by the main 71 and secondary 72 rotational drive, respectively, the rollers 86 rotate in place and rotate circumferentially in the bore of the nut 84, but do not move axially on the screw 82. The teeth of the crown rings guide the rollers 86 in rotation parallel to the axis X82. The screw 82 and guide 88 are axially fixed, and only the nut 84 has a linear displacement movement V84 along the axis X82. Moreover, when the guide 88 and screw 82 are driven at different rotational speeds, a rotational movement ω84 of the nut 84 is induced.

Moreover, the technical characteristics of the different embodiments may be combined with each other in whole or in part. Thus, the actuating mechanism may be adapted for purposes of cost, performance and ease of implementation.

The invention claimed is:
1. An actuating mechanism, comprising:
a main rotational drive;

a roller screw mechanism coupled to said main rotational drive, said roller screw mechanism containing:
a screw having an outer threading;
a nut disposed around and co-axially with said screw, said nut having an inner threading;
a plurality of rollers interposed between said screw and said nut and each of said rollers having an outer threading that engages with said outer and inner threadings of said screw and said nut, respectively, wherein one of said screw and said nut is coupled to said main rotational drive, the other of said screw and said nut being movable relative to said rollers both translationally and rotationally;
a secondary rotational drive; and
an annular guide for circumferential and axial retention of said rollers, said annular guide being mounted radially between said screw and said nut, said annular guide having a first annular heel, a second annular heel, and a plurality of elongated portions axially connecting said first and second heels so as to define a plurality of recesses separated from each other in a circumferential direction by said elongated portions, with each of said recesses accommodating one of said rollers, said annular guide having a cylindrical sleeve extending axially outward from one of said first and second annular heels beyond said nut, wherein said cylindrical sleeve having a bore formed therein and said screw extending into said bore of said cylindrical sleeve, and said cylindrical sleeve being coupled to said secondary rotational drive;
said main rotational drive and said secondary rotational drive being configured for rotating independently of one another.

2. The actuating mechanism according to claim 1, wherein each of said rollers has two cylindrical journals that extend axially outward from an axial end of a roller, said first and second annular heels of said annular guide having a plurality of recessed areas formed at each axial end of said recesses that accommodate said rollers, each of said recessed areas receiving one of said two cylindrical journal of said rollers.

3. The actuating mechanism according to claim 1, wherein each of said rollers has two sets of teeth on either side of said outer threading, and at each axial end, said roller screw mechanism has two annular crown rings fixed in a non-threaded part of a bore of said nut that each internally contain a set of teeth that engage with corresponding ones of said sets of teeth of said rollers.

4. The actuating mechanism according to claim 1, wherein said main rotational drive has a first motor.

5. The actuating mechanism according to claim 4, wherein said secondary rotational drive has a second motor separate from said first motor.

6. The actuating mechanism according to claim 1, wherein said annular guide has two symmetrical guide portions, each of said two symmetrical guide portions has a sleeve coupled to said secondary rotational drive.

7. The actuating mechanism according claim 6, wherein:
said secondary rotational drive has a motor, a shaft, and two gears coupled by said shaft and driven rotationally by said motor; and
each of said gears being coupled with said sleeve of one of said two symmetrical guide portions.

8. The actuating mechanism according claim 1, wherein:
said nut is coupled to said main rotational drive; and
said roller screw mechanism is a planetary roller screw mechanism.

9. The actuating mechanism according to claim 1, wherein:
said screw is coupled to said main rotational drive; and
said roller screw mechanism is an inverted planetary roller screw mechanism.

\* \* \* \* \*